(12) United States Patent
Johnson et al.

(10) Patent No.: US 6,283,017 B1
(45) Date of Patent: Sep. 4, 2001

(54) APPARATUS FOR TYING AND BINDING BALES OF COMPRESSED MATERIALS

(75) Inventors: Gerald L. Johnson, Carthage, MO (US); John Wiedel, Chicago, IL (US)

(73) Assignee: L & P Property Management Company, South Gate, CA (US)

( * ) Notice: Subject to any disclaimer, the term of this patent is extended or adjusted under 35 U.S.C. 154(b) by 0 days.

(21) Appl. No.: 09/522,582

(22) Filed: Mar. 10, 2000

Related U.S. Application Data

(63) Continuation of application No. 08/947,457, filed on Oct. 7, 1997, now abandoned, which is a continuation-in-part of application No. 08/547,329, filed on Oct. 24, 1995, now Pat. No. 5,704,283.

(51) Int. Cl.[7] .................................................. B65B 13/28

(52) U.S. Cl. .................... 100/31; 100/33 R; 140/93.6; 140/115

(58) Field of Search ................ 100/20, 31, 33 R; 140/93.6, 115, 119

(56) References Cited

U.S. PATENT DOCUMENTS

| | | |
|---|---|---|
| 218,741 | 8/1879 | Higgins . |
| 275,366 | 4/1883 | Dederick . |
| 985,023 | 1/1911 | Fry . |
| 989,260 | 4/1911 | Hinckley . |
| 1,180,934 | 4/1916 | Mottier . |
| 1,408,936 | 3/1922 | Gerrard . |
| 1,581,794 | 4/1926 | De Haven, Jr. . |
| 1,617,387 | 2/1927 | Gerrard et al. . |
| 1,699,482 | 1/1929 | Stevens . |
| 1,706,116 | 3/1929 | Harrah . |
| 1,814,188 | 7/1931 | Rietmann et al. . |
| 1,889,372 | 11/1932 | Nolan . |
| 2,098,945 | 11/1937 | Davis . |
| 2,173,403 | 9/1939 | Trimble . |
| 2,387,658 | 10/1945 | Gruber et al. . |
| 2,654,403 | * 10/1953 | Roe ....................................... 140/93.6 |
| 2,687,083 | * 8/1954 | Cranston, Sr. ........................... 100/31 |
| 2,757,599 | 8/1956 | Nolt et al. . |
| 2,777,384 | 1/1957 | Nolt et al. . |
| 2,792,776 | 5/1957 | Tarbox . |
| 2,796,662 | 6/1957 | Saum . |
| 2,859,687 | 11/1958 | Hill . |
| 2,868,239 | * 1/1959 | Ellis ...................................... 140/93.6 |
| 2,922,359 | 1/1960 | Brouse et al. . |
| 2,982,199 | 5/1961 | Jones . |
| 3,918,358 | 11/1975 | Burford . |
| 3,968,761 | 7/1976 | Tarrants . |
| 4,120,238 | 10/1978 | Schafer er al. . |
| 4,155,296 | 5/1979 | Schafer . |
| 4,167,902 | 9/1979 | Bister et al. . |
| 4,178,845 | 12/1979 | De Gryse . |
| 4,459,904 | 7/1984 | Probst et al. . |
| 4,572,554 | 2/1986 | Janssen et al. . |
| 4,577,554 | * 3/1986 | Brouse ................................... 100/31 |

(List continued on next page.)

FOREIGN PATENT DOCUMENTS 152933    1/1951   (AU) .

Primary Examiner—Stephen F. Gerrity
(74) Attorney, Agent, or Firm—Wood, Herron & Evans L.L.P.

(57) ABSTRACT

A mechanism for tying a bale of compressible material comprises a housing, a gear rotatably mounted with respect to the housing, and a drive mechanism operable for rotating the gear. A twister pinion is rotatably mounted with respect to the housing and is coupled to the gear to rotate when the gear rotates. The twister pinion includes a slot formed therein for receiving overlapped wire sections and twisting the wire sections upon rotation of the pinion. The twister pinion includes a sloped surface formed therein proximate at least one end of said slot. The sloped surface engages the overlapped wire sections and directs the wire sections inwardly toward a center axis of the pinion when the pinion is rotated.

6 Claims, 2 Drawing Sheets

U.S. PATENT DOCUMENTS

| | | |
|---|---|---|
| 5,279,336 | 1/1994 | Kusakari et al. . |
| 5,467,804 | 11/1995 | Kupferschmidt et al. . |
| 5,494,081 * | 2/1996 | Wiedel .................................. 140/93.6 |
| 5,704,283 * | 1/1998 | Wiedel ..................................... 100/31 |
| 5,870,950 * | 2/1999 | Wiedel ..................................... 100/31 |
| 5,921,289 * | 7/1999 | Johnson ............................... 140/93.6 |
| 6,032,575 * | 3/2000 | Johnson .................................. 100/31 |

* cited by examiner

APPARATUS FOR TYING AND BINDING BALES OF COMPRESSED MATERIALS

This application is a continuation of U.S. Ser. No. 08/947,457, filed Oct. 7, 1997 (abandoned), entitled "Method and Apparatus for Tying and Binding Bales of Compressed Material," which is a continuation-in-part of U.S. Ser. No. 08/547,329, filed Oct. 24, 1995, entitled "Automatic Tie System for Baler," which issued as U.S. Pat. No. 5,704,283 on Jan. 6, 1998. These pending applications and patents are all completely incorporated herein by reference in their entirety.

FIELD OF THE INVENTION

The present invention relates to tying or binding bales of compressed material. Specifically, the invention relates to an apparatus and method for tying and securing wires or other binding devices wrapped around such bales.

BACKGROUND OF THE INVENTION

Various types of bulk materials are shipped, stored, and otherwise processed and distributed in the form of compressed bales. For example, cotton is processed into compressed bales so that a great amount of cotton may be stored and shipped in a smaller space. Bales are also easier and more efficient to handle than the loose bulk material. It is generally known to wrap such bales of compressible material with wire or other elongated binding devices to keep the bales in a compressed form, such as for shipping and storage. Wire is often most preferable for its low cost and the ease with which it is handled.

One method of forming a bale directs the compressible material into an automatic baler where it is pressed into a bale by a ram and then moved by the ram through the baler. Continuous wire strands extend across the bale path at different heights on the bale, and as the bale moves through the baler, the wire strands are wrapped around the front end and sides of the bale. An automatic tying system then engages the bale and wire strands and ties the wire strands around the bale, such as by twisting together the overlapped ends of the wire strands. Examples of various automatic balers and tying methods are illustrated in U.S. Pat. Nos. 4,120,238; 4,155,296; 4,167,902, and 4,459,904. While automatic tying apparatuses have proven suitable for baling and tying compressed bales in certain applications, they generally require complex, expensive machinery which has to automatically manipulate and twist the wires and bales together to form the bale.

Alternatively, certain baling applications require hand splicing or tying of the wires wrapped around a bale in order to reduce the complexities and costs associated with automatic tying systems. Furthermore, the particular material being baled may dictate that hand tying is required, because of the complexities involved in trying to design an automatic tying apparatus.

Hand tying or splicing mechanisms in the prior art have provided a means for splicing or tying two wires together, such as to bind a bale. However, many such devices are bulky and complicated to utilize. Furthermore, they do not address the unique problems and scenarios which exist when bale wire ends are being tied together around a bale of compressed material.

Still further, many such splicers are made for wires which have overlapped ends which stay neatly together, whereas the overlapped ends of wires wrapped around compressed bales tend to want to separate before and during twisting. The separation of the wire ends while they are being tied together will degrade the strength of the knot or may even prevent the formation of a proper knot.

Another drawback in the prior art is the necessity of having to wrap the ends of the wires together numerous times in order for the ends to be properly secured together. This will often require multiple movements, such as multiple rotations of the elements of the tying mechanisms, which slows the tying process and reduces the overall efficiency of the process. This may also be particularly tiresome to a person doing the tying in the case of a manual mechanism. However, if the wire twist or knot is not adequately formed around the bale, the bale might not hold together.

Therefore, there is a need for a mechanism which rapidly and adequately ties and secures a wire or other similar binding device around a bale of compressed material.

It is an objective of the present invention to provide a simple and inexpensive apparatus for tying a wire around a bale rapidly and easily.

It is another objective of the present invention to handle and tie wire wrapped around bales while keeping the overlapped ends of the wire together.

It is a further objective of the present invention to wrap and tie bales with a strong durable twist or knot which has sufficient strength to hold the bales together even during handling.

It is still another objective of the present invention to bind and tie a bale of compressible material quickly and efficiently with continuous strands of baling wire.

These and other objectives will become more readily apparent from the Summary of the Invention and Detailed Description set forth hereinbelow.

SUMMARY OF THE INVENTION

The apparatus of the present invention for tying and binding bales of compressed bulk material comprises a housing which contains a twister pinion and worm gear in operable communication with the twister pinion. The worm gear is coupled through the housing to a drive mechanism including a drive motor which drives the gear and turns the twister pinion. One side of the housing includes a channel for capturing two overlapped ends of a wire and directing those overlapped ends into an appropriately formed slot in the twister pinion. When the twister pinion turns, the wire ends are twisted together and a knot is formed.

The twister pinion of the invention is rotatably mounted within the housing, and specifically within cap bushings at either end of the twister pinion. Yokes are positioned between the ends of the pinion and the bushings for smooth rotation of the pinion. The motor-driven worm gear provides for relatively rapid and easy rotation of the twister pinion to efficiently form the proper twist or knot.

In accordance with the principles of the present invention, the twister pinion has a slot formed therein to receive the overlapped wire end. The slot extends from an outer periphery of the pinion to a center rotational pinion axis. The pinion further comprises a sloped surface formed therein proximate at least one end of the slot. In a preferred embodiment, both ends of the slot include a sloped surface which slopes from an end of the pinion both longitudinally to the longitudinal center and radially toward the center rotational axis of the pinion. When the overlapped wire ends for twisting are inserted into the slot, the sloped surfaces engage portions of the overlapped ends. As the pinion rotates to form the twist, the sloped surfaces direct the opposite ends of the overlapped portion toward the center rotational axis of the twister pinion. In that way, the overlapped wire ends are maintained in the center of rotation of the pinion for proper twisting. Furthermore, as the twister pinion rotates, the ends of the wire are kept from moving radially outward to the periphery of the twister pinion which may prevent the formation of a proper knot and actually may prevent rotation of the twister pinion.

The twister pinion further comprises a pair of projections, one extending generally perpendicular to the plane of the pinion slot on either side of the slot. The projections extend toward each other proximate the longitudinal center of the pinion and leave a gap therebetween for gripping a section of the overlapped wire ends. The spacing of the gap between the projections will depend upon the size of the wire being twisted. The projections maintain the section of the overlapped wire ends next to each other and generally prevent a center section of the overlapped wire ends from being twisted together when the twist is formed. The projections are preferably located toward the center of the slot so that the center of the wire sections is held generally stationary relative the pinion while the remaining portion of the wire sections is twisted as the pinion rotates.

The cap bushings and yokes each include a narrow slot section in the center thereof for holding outer sections of the overlapped wire ends stationary. As the pinion twists, the center of the overlapped section is twisted while the outer ends are held stationary, thus forming a strong twist. The present invention provides a strong, durable, and properly formed twist which has sufficient strength to hold the bales together, even during handling. The motor drive of the worm gear provides for rapid, easy rotation of the pinion.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION OF THE INVENTION

Figure 1:
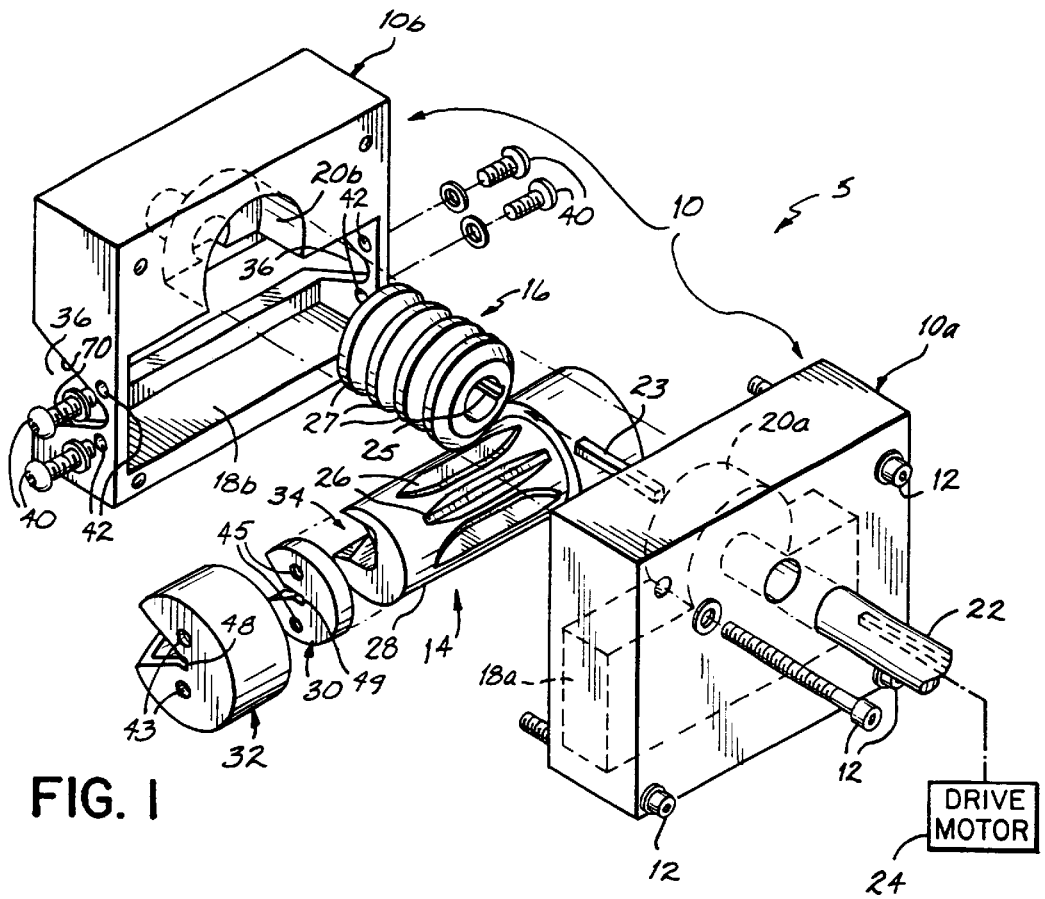
FIG. 1 is an exploded view of the tying mechanism of the invention.

FIG. 1 is an exploded view of an embodiment of the tying mechanism 5 of the present invention. The tying mechanism 5 includes a generally rectangular housing 10 which comprises two housing portions 10a and 10b, which are held together by appropriate fasteners, such as bolts 12. Housing 10 is preferably formed of aluminum, and is appropriately machined to operably support a twister pinion 14 and a gear 16. Accordingly, housing 10 includes a generally block-shaped channel formed by channel sections 18a and 18b in the appropriate housing pieces 10a and 10b. A cylindrically-shaped channel including channel sections 20a, 20b, is disposed generally perpendicular to the pinion channel 18a, 18b, for housing gear 16. In the preferred embodiment of the invention, gear 16 is a worm gear which is disposed generally perpendicular to the twister pinion 14 when assembled within housing 10. Worm gear 16 has an 8 diameter pitch, and is coupled to a drive shaft 22, which in turn is coupled to a drive mechanism 24. A key 23 in shaft 22 and a keyway or receiving slot 25 in gear 16 provide the coupling between the gear and shaft. Preferably, drive mechanism 24 includes a DC drive motor which rotates shaft 22 and thus rotates worm gear 16 within housing 10. Motor 24 is capable of rotation of at least 3400 RPM. The gear-to-pinion rotation ratio in one embodiment is approximately 10 to 1. When the tying mechanism 5 of the present invention is assembled, the twister pinion 14 is inserted into the pinion channel 18a, 18b, while the worm gear 16 is operably coupled or intermeshed with the twister pinion 14 and is inserted into the gear channel 20a, 20b. Worm gear 16 includes a continuous spiral tooth structure 27 which extends from one end of the gear to the other. Twister pinion 14 includes a plurality of longitudinal channels 26 which are formed and positioned radially around the pinion body 28. The spiral tooth structure 27 intermeshes with the pinion channels 26 so that rotation of worm gear 16 creates rotation of the pinion body 28. The drive motor 24 rotates drive shaft 22 to thus rotate worm gear 16 and the body 28 of twister pinion 14.

Figure 2:
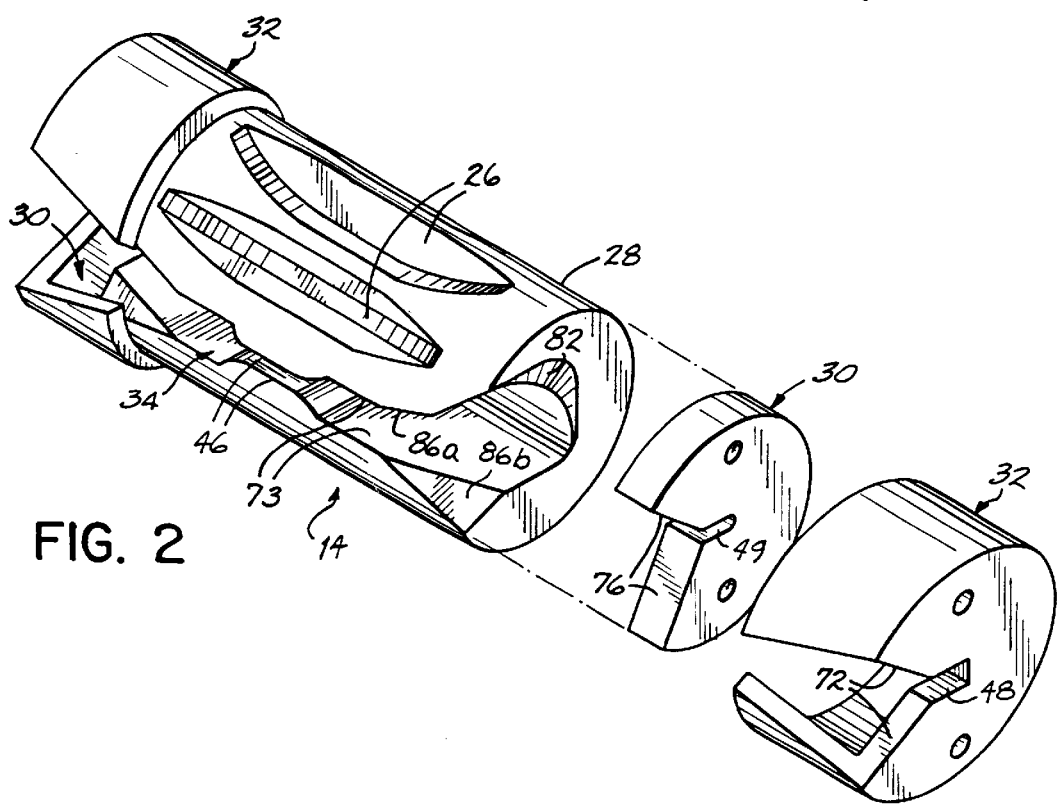
FIG. 2 is an exploded view of the inventive twister pinion utilized in the tying mechanism of FIG. 1.

Referring now to FIG. 2, the twister pinion 14 is shown in greater detail. Each twister pinion 14 includes a pinion body 28 which is coupled at its end with opposing yokes 30 and bronze cap bushings or end caps 32. The pinion body 28 is preferably formed of tool steel. The ends of the pinion body 28 abut against yokes 30 and rotate thereagainst. Yokes 30 are preferably formed of steel for easy and low friction rotation of the pinion body. The yokes 30 and bushings 32 are coupled together when the mechanism is assembled.

The pinion body 28, yokes 30 and bushings 32 are assembled together to form pinion 14 which has a longitudinal slot 34 therein. The generally cylindrical yokes 30 and bushings 32 have wedge-shaped removed sections, as illustrated in FIG. 2, for forming a portion of slot 34. The entire pinion 14 is mounted within channel 18a, 18b when the tying mechanism 5 is assembled. Housing piece 10b includes a V-shaped channel 36 which is formed therein to be generally parallel to channel section 18b. The V-shaped channel 36 aligns with the longitudinal slot 34 of the twister pinion 14 for receiving overlapped wire ends in accordance with the principles of the present invention. When housing 10 is assembled, the bushings 32 and yokes 30 are held stationary with respect to housing 10 and channel 18a, 18b, by appropriate fasteners, such as bolts 40 which extend through side openings 42 in the housing and into aligned openings 43 and 45 in the bushing 32 and yoke 30, respectively. In that way, bushings 32 and yokes 30 are held stationary with respect to housing 10.

Figure 3:
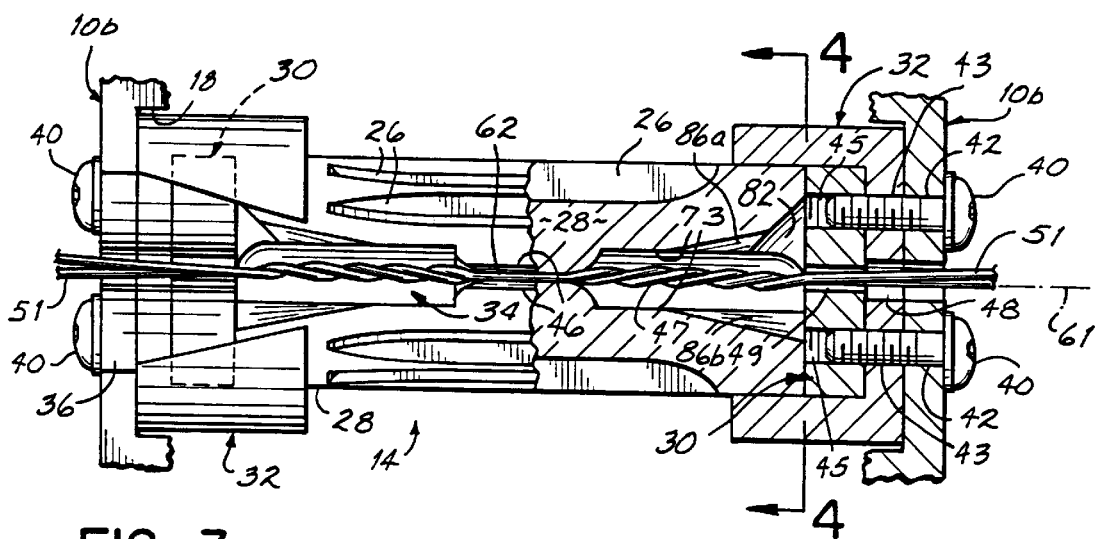
FIG. 3 is a side cross-sectional view of the twister pinion mounted in the tying mechanism.

The pinion body 28, however, rotates between the bushings 32 and yokes 30. When overlapped wire ends are inserted into the twister pinion slot 34 through channel 36 (See FIG. 3), rotation of the pinion body 28 will twist the overlapped wire ends to form a knot. The portion of slot 34 formed in twister pinion body 28 has a pair of raised projections 46 which extend into slot 34, generally at the longitudinal center of the body 28. When slot 34 receives the overlapped wire ends, the projections 46 hold the overlapped wire ends next to each other at the center section of the overlap to prevent the relative rotation of the overlap center section with respect to the pinion. That is, the overlapped ends remain untwisted in the center, as shown in FIG. 3. The space or gap between the projections 46 is sufficient to allow the overlapped wire ends to slide into the slot 34 while maintaining the wire sections next to each other at the projections 46. As will be appreciated, the gap between the projections can be dimensioned for a variety of wire gauges, depending upon the use of the tying mechanism 5.

When the knot 47 (see FIG. 3) is formed in accordance with the principles of the present invention, the center and the outer sections of the overlapped wire portions remain untwisted. That is, the side by side of the overlapped wire portions are maintained relatively stationary with respect to each other at the center and at the outer sections of the overlapped wire ends. Referring to FIGS. 2 and 3, the bushings 32 and yokes 30 each include narrow slot sections 48, 49, respectively. The narrow slot sections 48, 49 operate in conjunction with each other to hold the outer sections 51 of the overlapped wire ends stationary with respect to the rotating pinion body 28. As pinion body 28 rotates, the projections 46 grip the overlapped wire ends at the center of twist 47, and the rotation of the pinion body 28 twists the overlapped wire portions together between the center and the outer sections 51 to form twist 47.

Referring again to FIG. 3, the resulting twist or knot 47 formed by the twister pinion 14 is shown, including an untwisted center section 62, and untwisted end sections 51 with the twisted sections therebetween. The twisted sections are twisted in opposite directions. That is, the overlapped and twisted wires of one twist section are twisted in a counterclockwise direction with respect to center section 62. The twisted overlapped wires of the other end section, however, are twisted in a clockwise direction with respect to the center section 62. As a result, a strong twist is formed which resists unraveling and thereby provides a bale tie having a higher strength than the ties made by existing baling and tying systems. The slot 34 is dimensioned wide enough proximate the twisted sections to prevent binding of the wires in the pinion body when it is rotated.

When a twist 47 is formed in the present invention, twister mechanism 5 is positioned such that it engages the overlapped wire ends to form the twist 47. While the respective wires of the overlapped ends are preferably adjacent and parallel to one another before they are twisted, the wire ends might often be separated or may lie in slot 34 at the outermost periphery of the twister pinion 14 rather than along the rotational axis 61 of the pinion body 28 (see FIG. 4A). In accordance with the principles of the present invention, twister pinion 14 is preferably configured to direct the overlapped ends into the centermost position of the twister assembly slot 34 or generally proximate the center rotational axis 61 to form twists 47.

To that end, channel 36 has opposing angled surfaces 70, which are angled inwardly toward slot 34 to coincide with the slot and direct the wire portions into the slot 34. Forming the pinion slot 34, bushings 32 have angled surfaces 72 which are angled inwardly to the rotational axis 61 of pinion 14. The yokes 30 also have angled surfaces 76 which are angled toward axis 61. The angled surfaces 70, 72, 76 cooperate to direct the overlapped wire ends into the slot 34. The ends of the pinion body 28 are shaped to engage the overlapped wires and bring the wires to the center rotational axis of the twister pinion 14 to form a twist.

Referring to FIGS. 2, 3, 4A, 4B, and 4C, the side walls 73 of the portion of slot 34 formed by pinion body 28 are generally flat. However, the ends of the pinion body 28 include sloped or angled surfaces 82. The angled surfaces 82 preferably are spirally-shaped and spiral inwardly from the perimeter of the pinion body 28 toward the center rotational axis 61 of body 28. As the surfaces 82 spiral, they also slope or extend longitudinally from the ends of the pinion body 28 toward the projections 46 in the longitudinal center of body 28. Therefore, as shown in FIGS. 2 and 3, surfaces 82 slope in a spiral fashion into the rotational axis 61. As discussed further below, the spiral surfaces 82 direct the overlapped wire ends into the rotational axis 61 when the twist is formed.

On either side of slot 34 at both ends of the pinion body, additional angled surfaces 86 slope inwardly toward axis 61 and slope in the longitudinal direction from the ends of body 28 toward the projections 46 as illustrated in FIG. 3. The surfaces collectively referred to as 86 include surface 86a on one side of slot 34 and surface 86b on the other side of the slot. Surface 86a is partially coextensive with spiral surface 82 as shown in the Figures. The combination of the inwardly angled surfaces 82 and 86 acts to direct the overlapped wire sections to the center axis 61 of body 28 such that a sufficient twist is formed when the body 28 rotates.

Figure 4A:
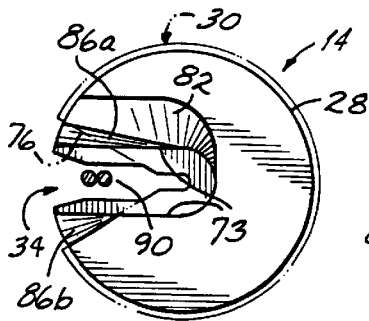
FIGS. 4A, 4B, and 4C are end views taken along line 4—4 of the twister pinion, shown directing overlapped wire ends toward the center rotational axis of the pinion.
Figure 4B:
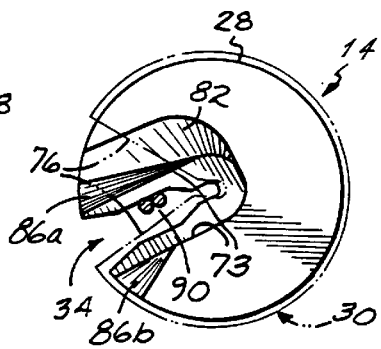
Figure 4C:
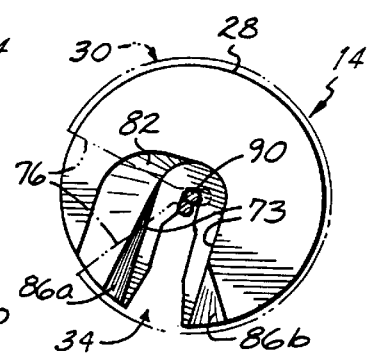

For example, if the overlapped wire ends 90 are at the outer periphery of the body 28, and the body is rotated counterclockwise as illustrated in FIG. 4A, the surfaces 82 and 86 engage the overlap 90. As the body 28 turns, surfaces 76 and 72 of the yoke 30 and bushing 32, respectively, engage the wire overlap 90. The overlap 90 is forced against the surfaces 82, 86 which directs the overlap inwardly toward the center axis 61, as illustrated in FIG. 4B. The sloped surfaces 82 and 86 cooperate to bring the overlapped wires to the axis of rotation 61 during rotation of pinion body 28. That is, the overlap 90 moves to the center axis of the pinion body 28. Surface 82 gradually directs the wires 90 in a spiral fashion into the center of pinion body 28. Generally, when the body 28 has completed less than one quarter of a turn, the wire overlap 90 is positioned at the axis 61 as shown in FIG. 4C. When the overlap is in this position, the center projections 46 properly grip the middle of the overlap. The bushings 32 and yokes 30 maintain the ends of the wire overlap 90 next to each other at a position spaced from the center section 62 of the overlap. As illustrated in FIG. 3, the individual wires of the overlap 90 are held next to each other at the twist center section 62 and proximate yoke 30 and bushing 32, but are free to twist elsewhere. Since the pinion body 28 rotates with respect to the bushings 32 and yokes 30, the ends of the twist are held stationary in the yokes 30 and bushings 32 while the center section 62 is twisted to form the twisted portions of twist 47.

Without the inward spiral surface 82 and sloping surfaces 86a and 86b, any overlapped wires which are captured by pinion 14 toward the outer periphery of the pinion body 28, and away from rotational axis 61, may tend to remain away from the rotational axis when the pinion body 28 begins to rotate. As a result, it may be difficult to rotate the pinion body 28 as the wire overlaps may bind to prevent proper formation of a twist 47. In accordance with the principles of the present invention, the wire overlap is directed inwardly toward the rotational axis 61 to be properly gripped by projection 62 and the appropriate portions 48 and 49 of the bushings and yokes for proper formation of twist 47.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A mechanism for tying a bale of compressible material comprising:

a housing;

a worm gear rotatably mounted with respect to the housing;

a drive mechanism operable for rotating said worm gear, the drive mechanism comprising a motor coupled to the worm gear to rotate the gear;

a twister pinion rotatably mounted with respect to the housing and coupled to the worm gear to rotate when the gear rotates, the twister pinion including a slot with opposing ends formed therein for receiving overlapped wire sections and twisting the wire sections upon rotation of said pinion;

the twister pinion including a sloped surface formed therein proximate each end of said slot, the sloped surface having a spiral shape and configured for engaging the overlapped wire sections and, when the pinion is rotated, directing the wire sections inwardly toward a center axis of the pinion.

2. The mechanism of claim 1 wherein said sloped surface slopes radially inwardly toward the center axis of said pinion.

3. The mechanism of claim 1 wherein said sloped surface slopes longitudinally along the length of said pinion.

4. The mechanism of claim 1 wherein said sloped surface slopes longitudinally along the length of said pinion and radially inwardly toward the center axis of said pinion.

5. The mechanism of claim 1 wherein said pinion further comprises projections extending into the slot from at least one side thereof, the projections operable for engaging a section of the overlapped wire ends to maintain said section generally untwisted when the pinion rotates.

6. The mechanism of claim 1 wherein said pinion further comprises a pair of projections each projecting into the slot from a side thereof, the projections operable for engaging a section of the overlapped wire ends to maintain said section generally untwisted when the pinion rotates.

* * * * *